US012258214B2

(12) United States Patent
Austrheim et al.

(10) Patent No.: US 12,258,214 B2
(45) Date of Patent: Mar. 25, 2025

(54) REMOTELY OPERATED VEHICLE FOR AN AUTOMATED STORAGE AND RETRIEVAL SYSTEM

(71) Applicant: Autostore Technology AS, Nedre Vats (NO)

(72) Inventors: Trond Austrheim, Etne (NO); Jon Hermansen, Heggedal (NO)

(73) Assignee: AutoStore Technology AS, Nedre Vats (NO)

( * ) Notice: Subject to any disclaimer, the term of this patent is extended or adjusted under 35 U.S.C. 154(b) by 823 days.

(21) Appl. No.: 17/291,162

(22) PCT Filed: Oct. 14, 2019

(86) PCT No.: PCT/EP2019/077742
§ 371 (c)(1),
(2) Date: May 4, 2021

(87) PCT Pub. No.: WO2020/094337
PCT Pub. Date: May 14, 2020

(65) Prior Publication Data
US 2022/0073279 A1    Mar. 10, 2022

(30) Foreign Application Priority Data
Nov. 6, 2018 (NO) .................... 20181417

(51) Int. Cl.
*B65G 1/137* (2006.01)
*B25J 5/00* (2006.01)
(Continued)

(52) U.S. Cl.
CPC ............ *B65G 1/1373* (2013.01); *B25J 5/007* (2013.01); *B25J 9/0009* (2013.01); *B25J 9/162* (2013.01); *B65G 1/0464* (2013.01); *B65G 1/065* (2013.01)

(58) Field of Classification Search
CPC .... B65G 1/1373; B65G 1/0464; B65G 1/065; B25J 5/007; B25J 9/162
See application file for complete search history.

(56) References Cited

U.S. PATENT DOCUMENTS 6,061,607 A      5/2000  Bradley et al.
2004/0089657 A1* 5/2004  Waszak ................. B65F 1/0053
                                                         220/4.03
(Continued)

FOREIGN PATENT DOCUMENTS

CN    105059811 A    11/2015
CN    106414278 A    2/2017
(Continued)

OTHER PUBLICATIONS

International Search Report issued in PCT/EP2019/077742 on Jan. 16, 2020 (6 pages).
(Continued)

*Primary Examiner* — Kyle O Logan
(74) *Attorney, Agent, or Firm* — Baker Botts L.L.P.

(57) ABSTRACT

A remotely operated vehicle for an automated storage and retrieval system moves a product item between a storage container stored in an automated storage and retrieval grid configured to store a plurality of stacks of storage containers, and a further container. The remotely operated vehicle includes a vehicle body; a wheel arrangement connected to the vehicle body configured to move the remotely operated vehicle along a rail system of the automated storage and retrieval system; and a picking system for moving the product item between the storage container and the further container. The vehicle includes a container lifting device configured to carry the further container. The picking system includes a picking arm having a first end connected to the vehicle body and a second end. The picking system includes
(Continued)

a holding mechanism for releasably holding of the product item. The holding mechanism is provided in the second end of the picking arm.

11 Claims, 8 Drawing Sheets

(51) Int. Cl.
    *B25J 9/00*         (2006.01)
    *B25J 9/16*         (2006.01)
    *B65G 1/04*        (2006.01)
    *B65G 1/06*        (2006.01)

(56) References Cited

U.S. PATENT DOCUMENTS

| | | |
|---|---|---|
| 2015/0073589 A1 | 3/2015 | Khodl et al. |
| 2015/0098775 A1* | 4/2015 | Razumov ............... B66F 11/04 414/807 |
| 2015/0332213 A1 | 11/2015 | Galluzzo et al. |
| 2018/0319590 A1* | 11/2018 | Lindbo ............... B65G 1/0464 |

FOREIGN PATENT DOCUMENTS

| | | | |
|---|---|---|---|
| EP | 0169156 A1 | 1/1986 | |
| GB | 2544648 A * | 5/2017 | ............... B25J 5/02 |
| NO | 317366 B1 | 10/2004 | |
| WO | 2014/075937 A1 | 5/2014 | |
| WO | 2014/090684 A1 | 6/2014 | |
| WO | 2015/193278 A1 | 12/2015 | |
| WO | 2016/198467 A1 | 12/2016 | |
| WO | 2016/198565 A1 | 12/2016 | |

OTHER PUBLICATIONS

Written Opinion of the International Searching Authority issued in PCT/EP2019/077742 on Jan. 16, 2020 (10 pages).
Norwegian Search Report issued in NO 20181417 mailed on May 14, 2019 (2 pages).
[Anonymous] The First Office Action for Chinese patent application No. 201980070902.3, dated Apr. 2, 2022, 18 pages, published by the State Intellectual Property Office, People's Republic of China.
Anonymous] Search Report or Chinese patent application No. 201980070902.3, dated Jul. 1, 2022, 4 pages, published by the State Intellectual Property Office, People's Republic of China.

* cited by examiner

C

D

2

REMOTELY OPERATED VEHICLE FOR AN AUTOMATED STORAGE AND RETRIEVAL SYSTEM

TECHNICAL FIELD

The present invention relates to a remotely operated vehicle for an automated storage and retrieval system for moving a product item between a storage container stored in an automated storage and retrieval grid configured to store a plurality of stacks of storage containers. The present invention also relates to a method for moving a product item between a storage container stored in an automated storage and retrieval grid of an automated storage and retrieval system.

BACKGROUND AND PRIOR ART

FIGS. 1A and 1C disclose a typical prior art automated storage and retrieval system 1 with a framework structure 100. FIGS. 1B and 1D disclose a prior art container handling vehicle 101 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical, or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a container handling vehicle rail system 108 arranged in a grid pattern across the top of the storage 104, on which rail system 108 a plurality of container handling vehicles 200, 300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 200,300 so that the position of the gripping/engaging devices with respect to the vehicle 200,300 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 101 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 105, e.g. as is disclosed in WO2014/090684A1.

The rail system 108 may be a single track system, as is shown in FIG. 2A. Alternatively, the rail system 108 may be a double track system, as is shown in FIG. 2B, thus allowing a container handling vehicle 201 having a footprint 202,202' generally corresponding to the lateral area defined by a grid column 112 to travel along a row of grid columns even if another container handling vehicle 200 is positioned above a grid column neighboring that row. Both the single and double track system, or a combination comprising a single and double track arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of neighboring rails defining parallel rows of grid cells running in the X direction, and rails 111a and 111b form pairs of neighboring rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells 122 are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station (not shown), and the second delivery column 120 may comprise a dedicated pick-up port where the container handling vehicles 200,300 can pick up storage containers 106 that have been transported through the delivery column 120 from an access or a transfer station (not shown). Each of the ports of the first and second delivery column 119,120 may comprise a port suitable for both pick up and drop of storage containers 106.

The second location may typically be a picking or a stocking station where product items are removed from or positioned into the storage containers 106. In a picking or a stocking station, the storage containers 106 are normally never removed from the automated storage and retrieval system 1, but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

A conveyor system comprising conveyors may be employed to transport the storage containers between the lower port of the delivery column 119,120 and the access station.

If the lower port of the delivery column 119,120 and the access station are located at different levels, the conveyor system may comprise a lift device for transporting the storage containers 106 vertically between the port and the access station.

The conveyor system may be arranged to transfer storage containers between different grids, e.g. as is described in WO2014/075937A1, the contents of which are incorporated herein by reference.

Further, WO2016/198467A1, the contents of which are incorporated herein by reference, disclose an example of a prior art access system having conveyor belts (FIGS. 5a and 5b in WO2016/198467A1) and a frame mounted rail (FIGS. 6a and 6b in WO2016/198467A1) for transporting storage containers between delivery columns and work stations where operators can access the storage containers.

When a storage container 106 stored in the grid 104 disclosed in FIG. 1A is to be accessed, one of the container handling vehicles 200,300 is instructed to retrieve the target storage container 106 from its position in the grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105, or relocated to other storage columns 105.

A problem associated with known automated storage and retrieval systems 1 is that the area surrounding the pick-up and drop-off ports may become congested with container handling vehicles 200,300 instructed to drop off or pick up storage containers 106. This may seriously impede the operation of the automated storage and retrieval system 1. In small systems this situation may possibly be alleviated by adding delivery columns to the grid, as this will allow the container handling vehicles 200,300 to be distributed among a larger number of ports of delivery columns in order to avoid congestion. However, if ports and columns are added, the conveyor system infrastructure must normally be increased. This requires space, which may not necessarily be available. Also, adding conveyor system infrastructure is costly.

Another problem with prior art automated storage and retrieval systems 1 is that the separate drop-off ports and pick-up ports of the delivery columns 119,120 require the container handling vehicles 200,300 to move to a storage column 105 after drop-off to retrieve a new storage container 106. Likewise, the container handling vehicles 200,300 have to be empty of a storage container 106 when they are sent to a pick-up port 120 to pick up a storage container. This results in an inefficiency and causes increased congestion around the ports, as container handling vehicles 200,300 are moving around on the grid without a storage container 106 as payload. In addition, the delivery columns 119,120 may take up space on the grid 104 which could be used for other purposes such as the movement of container handling vehicles 200,300.

It is known, for example from WO2016/198565, to provide the above automated storage and retrieval system with a robot device comprising a movable arm with a picking mechanism in one end thereof, for moving product items between storage containers 106. The robot device can be fixed to the grid or it can be fixed to the ceiling of the building in which the grid is located. The robot device in this prior art is used to move product items between storage containers 106 located on the top level of the grid and storage containers 106 located on a conveyor belt of a conveyor system.

Also here, the area surrounding the robot device may become congested with container handling vehicles 200,300 instructed to drop off or pick up storage containers 106. Moreover, adding conveyor system infrastructure is costly.

GB 2544648 (Ocado Innovation) discloses an automated storage and retrieval system with a robot device for picking product items where the robot device is fixed to a robot vehicle, thereby forming a picking vehicle. Container handling vehicles are moved adjacent to this picking vehicle and the picking vehicle moves product items between the containers held by the container handling vehicles.

There are several disadvantages with the above picking vehicle. First, at least three vehicles are used during the picking operation—the picking vehicle itself, and two container handling vehicles. In practice, it is assumed that the picking vehicle will be relatively stationary, while the container handling vehicles will be used to move desired containers to and from the picking vehicle.

In view of the above, it is desirable to provide an automated storage and retrieval system, and a method for operating such a system, that solve or at least mitigate one or more of the aforementioned problem related to use of prior art storage and retrieval systems.

An objective of the invention is to provide an automated storage and retrieval system which is more effective than prior art systems by avoiding or at least reducing congestion at specific locations of the grid.

SUMMARY OF THE INVENTION

The present invention relates to a remotely operated vehicle for an automated storage and retrieval system for moving a product item between a storage container stored in an automated storage and retrieval grid configured to store a plurality of stacks of storage containers, and a further container; where the remotely operated vehicle comprises:
- a vehicle body;
- a wheel arrangement connected to the vehicle body configured to move the remotely operated vehicle along a rail system of the automated storage and retrieval system;
- a picking system for moving the product item between the storage container and the further container;

characterized in that:
- the vehicle comprises a container lifting device configured to carry the further container;
- the picking system comprises a picking arm having a first end connected to the vehicle body and a second end;
- the picking system comprises a holding mechanism for releasably holding of the product item, the holding mechanism being provided in the second end of the picking arm.

In one aspect, the further container may be a target container, where the picking system is configured to move the product item from the storage container to the target container. Alternatively, the further container may be a replenishing container, where the picking system is configured to move the product item from the replenishing container to the storage container.

The target container and the storage container may be of the same type. However, the target container and the storage container may also be of different types. The target container may be larger than or smaller than the storage container, it may have a different connection interface than the storage container etc.

In one aspect, the first end of the picking arm is connected to a top surface of the vehicle body.

Alternately, the picking arm may be provided on a side surface or on a rear surface of the vehicle body 31.

In one aspect, the container lifting device is an open-top container lifting device.

The term "open-top" here refers to a container lifting device where access to the container from above is possible through an access opening in the container lifting device.

In one aspect, the container lifting device is configured to lift the further container to a height above the top level of the grid.

The height may be sufficient for the vehicle to carry the further container during its horizontal movement on the grid.

In one aspect, the container lifting device is configured to lower the further container into a grid column of the grid.

In one aspect, the container lifting device is arranged as a cantilever structure fixed to the vehicle body, where the container lifting device comprises a container lifting frame with a connection interface CI for connection to and disconnection from the target container 6 provided below the cantilever structure.

In one aspect, the cantilever structure comprises an access opening to the further container being carried by the container lifting device, where the picking system is configured to move the product item through the access opening to and from the further container.

In one aspect, the cantilever structure is provided as a cantilever section protruding from a front side of the vehicle body.

The cantilever structure may be integrated as part of the vehicle body itself.

In one aspect, the cantilever structure is provided as a frame section connected to the vehicle body via a housing section.

The cantilever structure may be a separate body being connected to the vehicle body.

In one aspect, the remotely operated vehicle comprises two container lifting devices.

The two container lifting devices may be provided on opposite sides of the vehicle body to counterbalance each other and hence provide stability.

In one aspect, the wheel arrangement has a width equal to a width of a grid cell of the automated storage and retrieval grid and a length equal to a length of the grid cell of the automated storage and retrieval grid.

Hence, the wheel arrangement only covers one single grid cell, thereby allowing other vehicles to move along adjacent grid cells.

In one aspect, the picking system comprises a picking arm and a holding mechanism, where the picking arm has a first end connected to the vehicle body and a second end connected to the holding mechanism.

The first end may be pivotably connected to the vehicle body. Alternatively, the first end may be axially displaceably connected to the vehicle body. The second end may be pivotably connected to the holding mechanism. Alternatively, the second end may be axially displaceably connected to the holding mechanism. The picking arm may comprise arm sections, which may be pivotably connected to each other or they may be axially displaceably connected to each other. The picking arm may comprise one, two or three arm sections. The above pivotable connections may be pivotable around a horizontal axis, a vertical axis or an inclined axis.

Alternatively, two or more arm sections may be provided as telescopic sections. In yet an alternative, two or more arm sections may be slidably connected to each other, where a linear actuator is used to extend or retract the arm sections with respect to each other.

The present invention also relates to a method for moving a product item between a storage container stored in an automated storage and retrieval grid of an automated storage and retrieval system, where the grid is configured to store a plurality of stacks of storage containers, and a further container, where the method comprises the steps of:
- carrying the further container by means of a container lifting device of a remotely operated vehicle, the remotely operated vehicle comprising a body and a wheel arrangement connected to the vehicle body;
- moving the vehicle along a rail system of the automated storage and retrieval system to a predetermined grid position;
- controlling a picking system comprising a holding mechanism and a picking arm to hold the product item being located at a initial container position, where the picking arm has a first end connected to the vehicle body and a second end connected to the holding mechanism;
- controlling the picking system to move the product item to a further container position and to release the product item at the further container position.

As described above, the further container may be a target container or a replenishing container.

The term "container position" may be the position of a storage container stored in the grid or it may be the position of the further container carried by the vehicle. The "container position" may also be a predetermined location within the container, for example a predetermined compartment within the container, a predetermined shipping package located within the container etc. One of the initial container and target container is the further container. The initial grid position may be a position where both the initial container position and the target container position is within reach of the picking system.

In one aspect, the step of controlling the picking system to move the product item to a target container comprises to move the product item through an access opening provided above the target container.

The present invention also relates to a automated storage and retrieval system comprising:
- an automated storage and retrieval grid configured to store a plurality of stacks of storage containers;
- a remotely operated vehicle as defined above.

In the above aspects, the access opening is always open. However, in some embodiments, it may be possible to temporarily open and close the access opening by means of a lid or cover.

BRIEF DESCRIPTION OF THE DRAWINGS

The following drawings depict exemplary embodiments of the present invention and are appended to facilitate the understanding of the invention.

FIG. 1C shows the complete system and FIG. 1B and FIG. 1D shows examples of system operable prior art container handling vehicles.

FIG. 2A shows a single track system, FIG. 2B shows a double track system 2B and FIG. 2 C shows a double track system indicated width and length of a container handling vehicle grid cell.

FIG. 3b illustrates a side view of the embodiment in FIG. 3a;

FIG. 3c illustrates another side view of the embodiment in FIG. 3a;

DETAILED DESCRIPTION OF THE INVENTION

Figure 1:
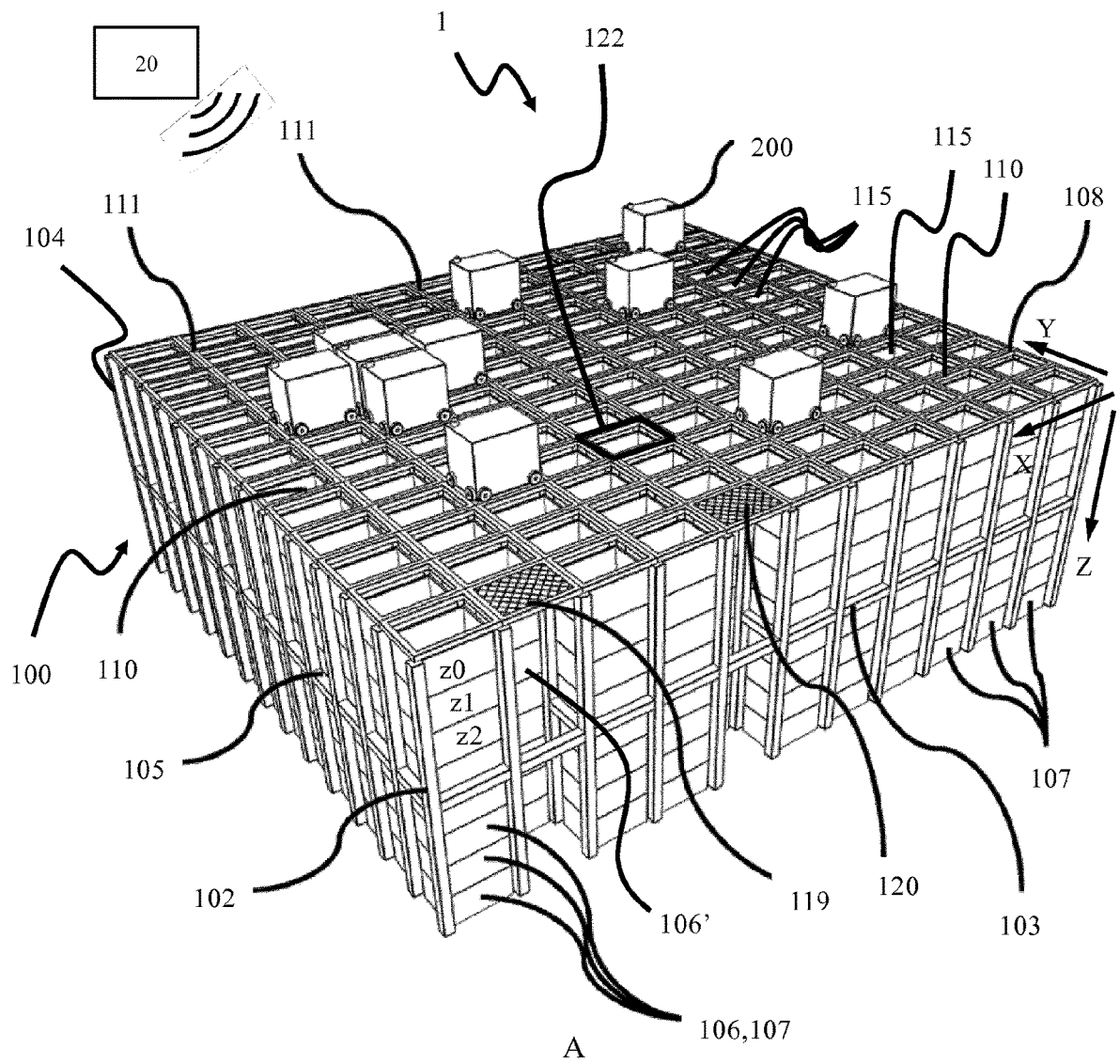
FIG. 1 A-D are perspectives view of a prior art automated storage and retrieval system, where FIG. 1A
Figure 1:
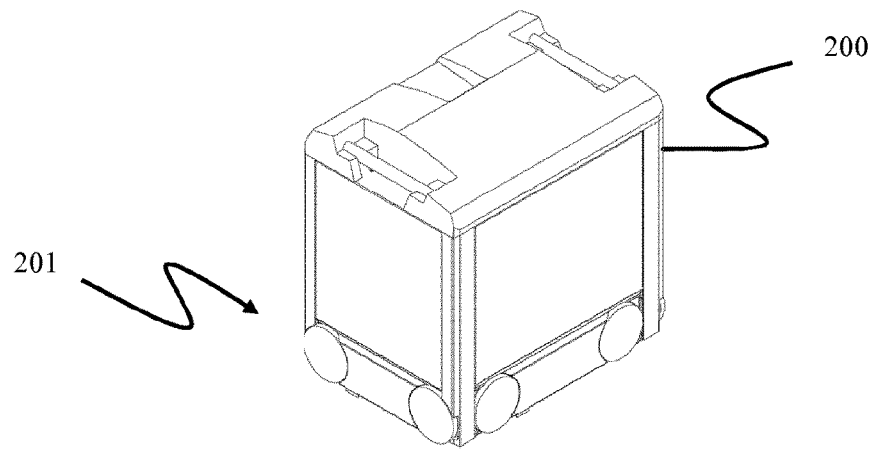
Figure 1:
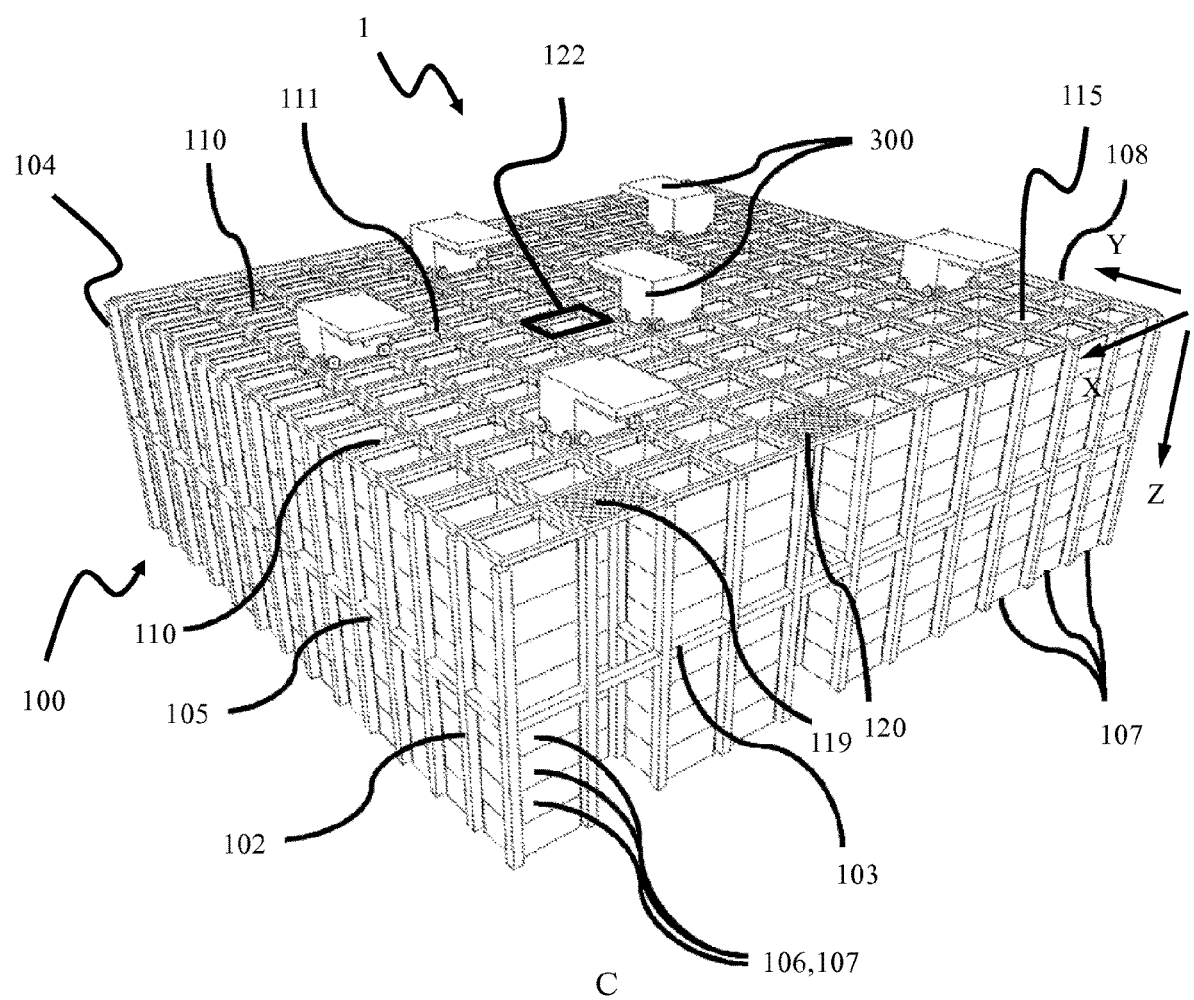
Figure 1:
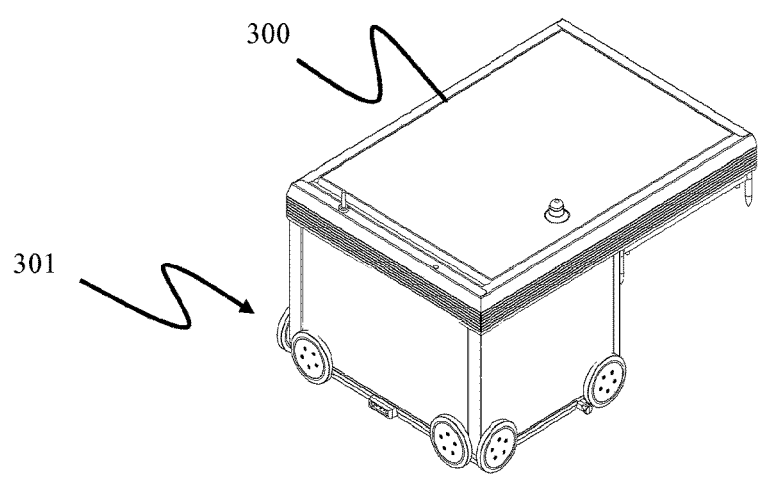

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the delivery vehicles and related methods as well, and vice versa. Hence, any features described in relation to the delivery vehicle only, and/or related methods, are also valid for the system.

With reference to FIGS. 1A-D the storage grid 104 of each storage structure 1 constitutes a framework 100 of in total 143 grid columns 112, where the width and length of the framework corresponds to the width and length of 13 and 11 grid columns 112, respectively. The top layer of the framework 100 is a rail system 108 onto which a plurality of container handling vehicles 200,300 are operated.

Figure 2:
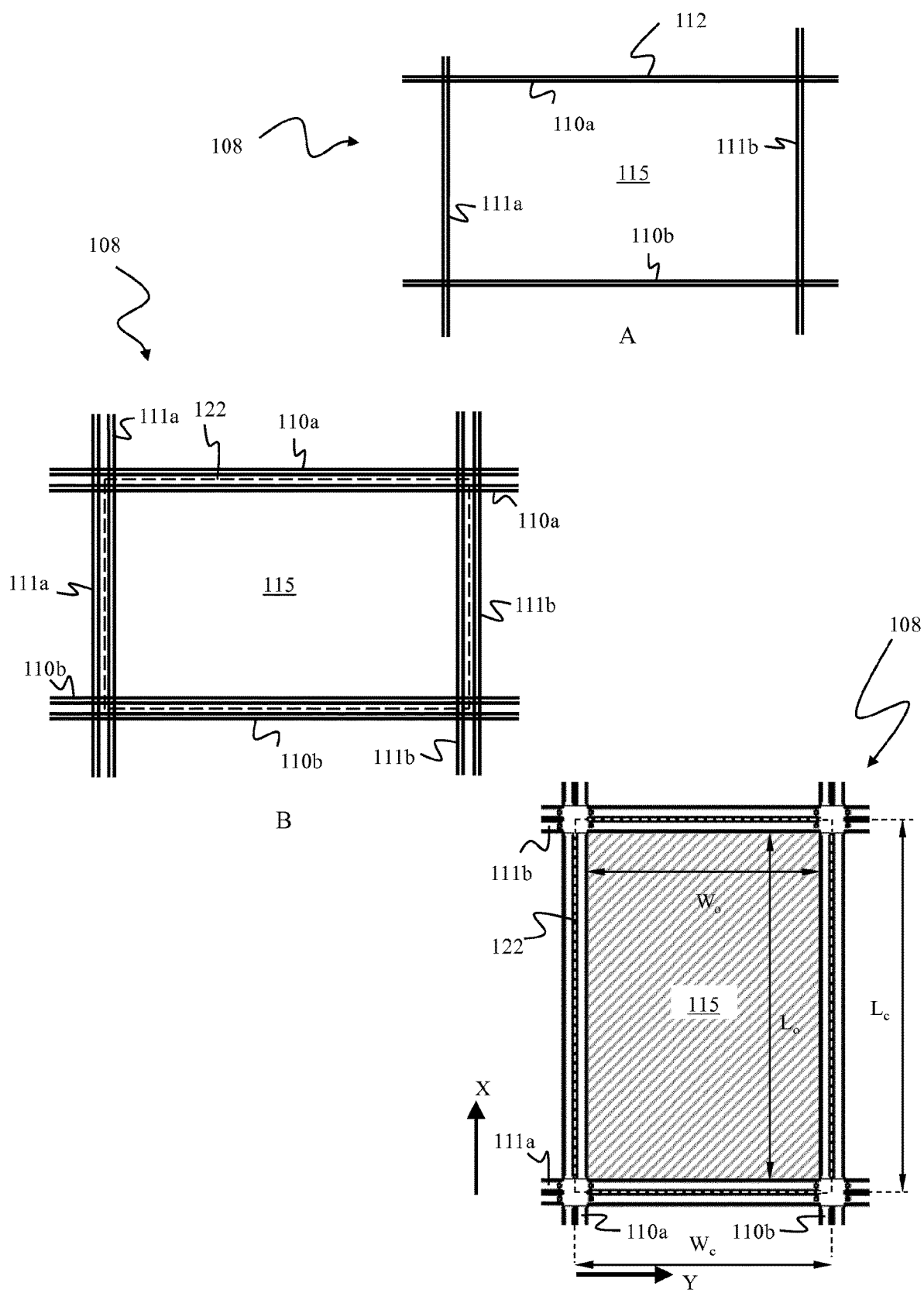
FIG. 2 A-C is a top view of a container handling vehicle rail system, where

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes a container handling vehicle rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIG. 2). In FIGS. 1A and 1C, such a grid cell 122 is marked on the rail system 108 by thick lines.

The container handling vehicle rail system 108 allows the container handling vehicles 200,300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122. Also, the grid 104 can be considerably deeper than disclosed in FIGS. 1A and 1C. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

The rail system 108 may be a single track system, as is shown in FIG. 2A. Alternatively, the rail system 108 may be a double track system, as is shown in FIG. 2B. Details of the single and double track system are disclosed this specification under the section of background and prior art. In yet an alternative, the rail system 108 may be a combination of a double track system and a single track system.

In FIG. 1A, a control system of the automated storage and retrieval system 1 is shown as a box 20 provided in communication with the vehicles 200, 300.

First Embodiment

It is now referred to FIG. 3a-c and FIG. 4a. Here, a remotely operated vehicle 30 for the above automated storage and retrieval system 1 is disclosed. The main purpose of the remotely operated vehicle 30 is to perform a picking operation, i.e. to move one or several of the same type of product item, or to move several types of product items, from one or several storage containers 106 stored in the grid 104 to a further container. In the description below, this further container is referred to as a target container 6. Hence, this vehicle 30 may be referred to as a picking vehicle. This picking operation is typically performed based on a picking order, where one or several product items is picked, packaged into a shipping package and then sent to the address of the receiver who typically placed the picking order. It should be noted that the picking operation may be performed by picking product items directly into the target container, or by picking product items into one or more shipping packages arranged in the target container.

It should be noted that the vehicle 30 may be used to move one or several product items from the further container 6 to one or several storage containers 106. In this case, the vehicle 30 may be used to perform a replenishing operation.

It should be noted that in the present embodiment, the storage containers 106 and the target container 6 are of the same type.

The remotely operated vehicle 30 comprises a vehicle body 31 and a wheel arrangement 32 connected to the vehicle body 31. The wheel arrangement is configured to move the remotely operated vehicle 30 along the rail system 108 of the automated storage and retrieval system 1. The present embodiment of the vehicle 30 is based on the prior art container handling vehicle 300 shown in FIG. 1D, having a cantilever section 33a protruding from the vehicle body 31. The wheel arrangement 32 is considered to be prior art and will not be described further in detail herein. As the vehicle 30 is based on the container handling vehicle 300, costs may be saved as many of the same spare parts may be used for these vehicles 30, 300.

The vehicle 30 further comprises a container lifting device 50 configured to carry the target container 6. The container lifting device 50 comprises a container lifting frame 54 with a connection interface CI (FIG. 3c) for connection to and disconnection from the target container 6. In the present embodiment, the container lifting device 50 is of the same type of as the container lifting device 50 of the prior art container handling vehicle 300, where the container lifting device 50 is provided below the cantilever section 33a of the vehicle body 31. This container lifting device 50 is configured to lift the target container 6 to a height H1 above the top level of the grid 104 (see FIG. 4a) in order to carry the target container 6 during horizontal movement of the vehicle 30.

Figure 4A:
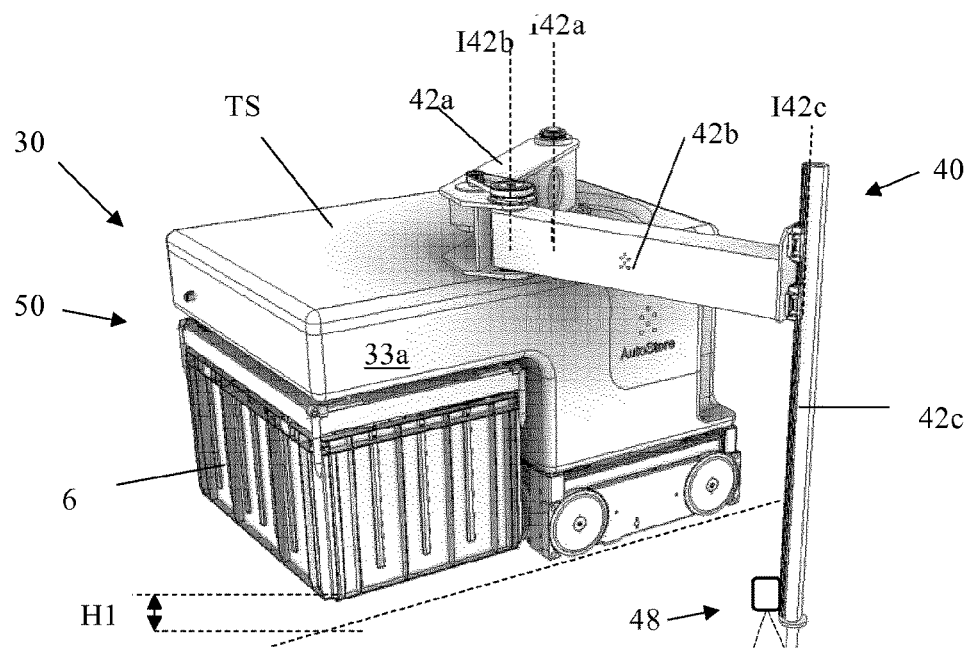
FIG. 4a illustrates a perspective view of the embodiment in FIG. 3a with the picking arm in use.

In FIG. 4a, this height H1 is indicated as the vertical distance between the wheels which are in contact with the grid 104 and the lowermost part of the container 6. The container lifting device 50 is also configured to lower its connection interface into a grid column 105 of the grid 104 for connection to the target container 6 or for releasing the target container 6.

Figure 3A:
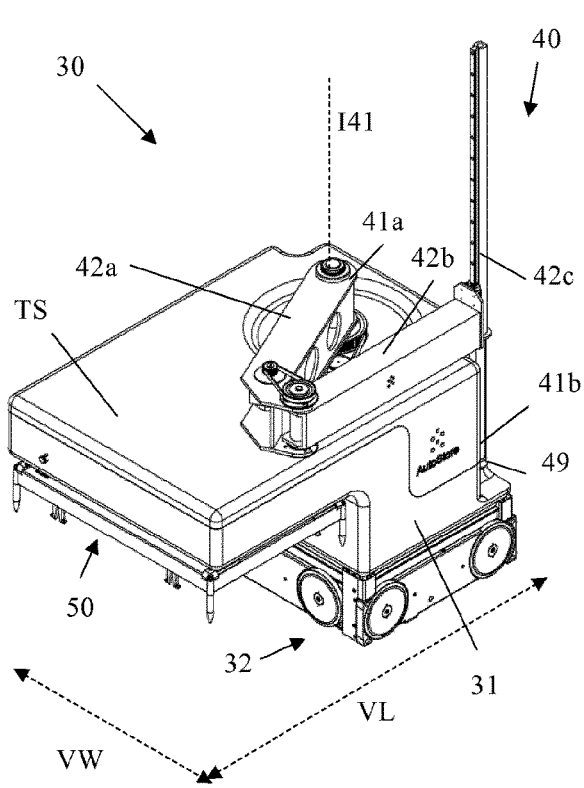
FIG. 3a illustrates a perspective view of a first embodiment of the invention, with a picking arm in its resting position.

It is now referred to FIGS. 3a and 4a, where it is shown that the vehicle 30 further comprises a picking system 40 for moving the product item 5 between the storage container 106 and the target container 6. The picking system 40 comprises a picking arm 41 having a first end 41a connected to the vehicle body 31 and a second end 41b connected to a holding mechanism 49 of the picking system 40.

The picking arm 41 comprises several arm sections pivotably connected to each other. In FIGS. 3a and 4a, it is shown that the picking arm 41 comprises a first arm section 42a pivotably connected to the top surface TS of the vehicle body 31, a second arm section 42b pivotably connected to the first arm section 42a and a third arm section 42c axially displaceable with respect to the second arm section 42b, where the holding mechanism 49 is located in the end of the third arm section 42c. In the present embodiment, the first arm section 42a is pivotable with respect to the vehicle body 31 around a first vertical axis I42a, the second arm section 42b is pivotable with respect to the first arm section 42a around a second vertical axis I42b and the third arm section 42c is axially displaceable with respect to the second arm section 42b along a third vertical axis I42c.

It should be noted that the vehicle 30 with its wheel arrangement 32, its container lifting device 50 and its picking system 40 is controlled by a control system. This control system will typically be the same control system being used for monitoring and controlling the automated storage and retrieval system 1, as mentioned in the introduction above. It should be noted that picking arms with holding mechanisms are commercially available—and are considered prior art. Hence, the control of such picking arms with holding mechanism will not be described in detail herein.

The holding mechanism 49 is configured to releasably holding the product item 5, and can use one of many known holding principles, such as by using a suction force provided by an air pump, a magnetic force provided by an electro-magnet, a clamping force by using a claw operated by electric servo motors etc. It may even comprise a combination of two or more of these holding principles. In addition, the picking system 40 may comprise object recognition equipment 48 (shown in FIG. 4b) for recognizing the product item 5 in order to control the positioning of the picking arm and the holding mechanism 49 in relation to the product item 5 in order to hold it. The object recognition equipment 48 may also be used during release of the product item 5, for example in cases where the product items 5 are released into a shipping package (not shown) provided inside the target container 6. This shipping package may be a cardboard box, a rigid or semi-rigid bag, an envelope etc. The shipping package may be individually marked, in order for the picking system 40 to release the product item 5 into one specific shipping package of a plurality of shipping packages provided in the target container 6.

It should be noted that the object recognition equipment 48 and the holding mechanism 49 should be selected based on the properties of the product items stored in the automated storage and retrieval system 1, such as size, weight, shape, color, packaging material etc.

It should also be noted that this embodiment only shows one of a range of available picking arms and holding mechanisms.

Figure 3B:
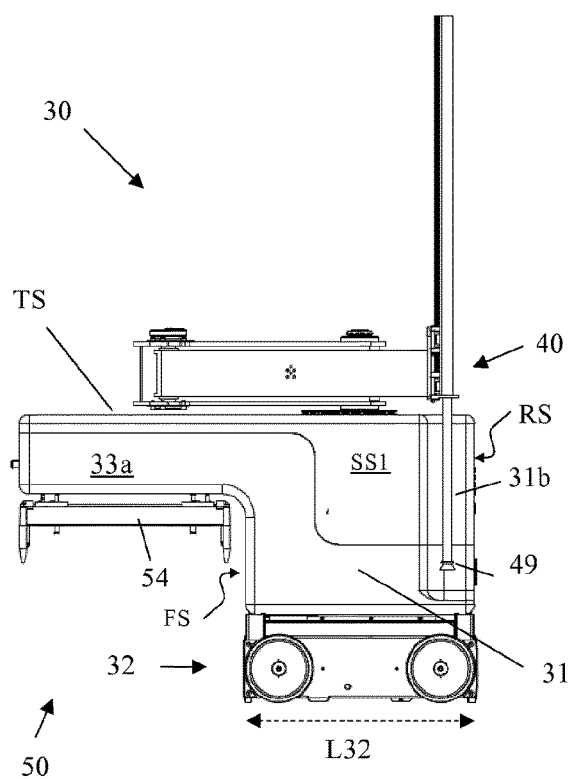
Figure 3C:
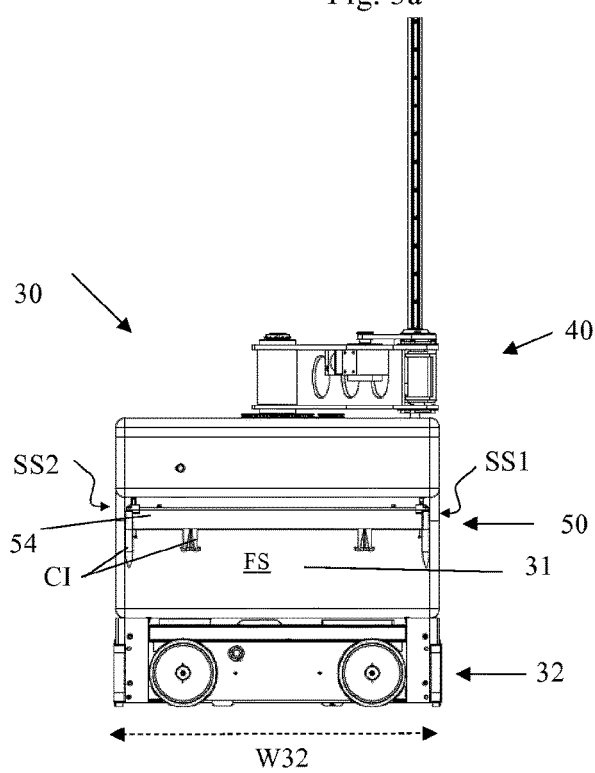

In FIGS. 3b and 3c, the term "front surface" FS is indicated as one side surface of the vehicle body 31 located on the same side as the cantilever structure 33a, where the term "rear surface" RS is used for the one side surface located on the opposite side as the front surface FS. First and second side surfaces SS1, SS2, being perpendicular to the front and rear surfaces FS, RS are also indicated in FIG. 3c.

Figure 5:
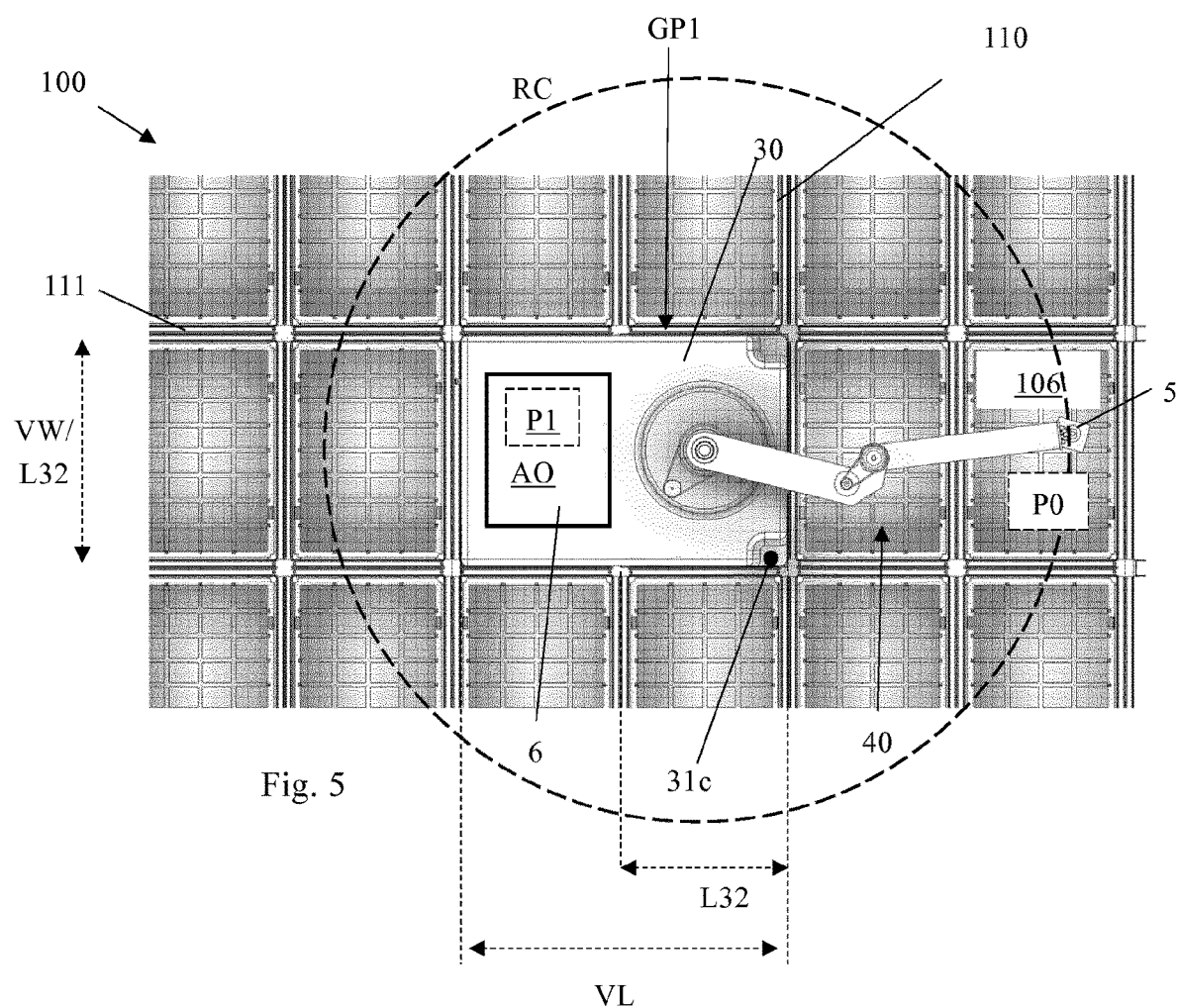
FIG. 5 illustrates the range of the picking arm of the first and second embodiments.

It is now referred to FIGS. 3a and 3b, where it is shown that the third arm section 42c and the holding mechanism 49 are provided in a recess 31b provided in the vehicle body 31. Here, the picking system 40 is in an inactive state or in a resting position. Here, the picking system 40 is provided within the limits of the vehicle length VL and vehicle width VW shown in FIG. 3a. Hence, the picking system 40 only increases the height of the vehicle 30. This is also shown in FIG. 5. Here, also the range of the picking system 40 is illustrated by a dashed circle RC.

In FIG. 3b and FIG. 3c, it is shown that the wheel arrangement 32 has a width W32 and a length L32. In FIG. 5, it is shown that the width W32 is equal to a width Wc of a grid cell 122 of the automated storage and retrieval grid 104 and that the length L32 is equal to a length Lc of the grid cell 122 of the automated storage and retrieval grid 104. Hence, the wheel arrangement 32 only covers one single grid cell 122, thereby allowing other vehicles to move along adjacent grid cells.

The picking operation will now be described. First, it should be noted that the storage containers 106 from which product items 5 is to be picked from, must be positioned at a height in the grid 104 which is within reach of the picking system 40 of the vehicle 30. This is typically performed by using container handling vehicles 200, 300 to stack storage containers 106 above each other to the desired height and then position the storage container 106 from which product items 5 is to be picked from, on top of the stack. Product items 5 located in storage containers 106 provided at the first and second levels, indicated in FIG. 1 as levels z0 and z1, are typically within reach of the picking system 40.

The position of the product item 5 that is to be picked may be referred to as an initial container position P0, which in FIG. 5 is indicated to be the position of the storage container 106. The target container position P1 is the position of the target container 6 carried by the vehicle 30.

Initially, the vehicle is carrying the further container 6 by means of a container lifting device 50 to a predetermined grid position GP1. In this example, the initial grid position GP1 is a position where the storage container 106 is within reach of the picking system 40, as shown in FIG. 5.

Then, the holding mechanism 49 is positioned in relation to the product item 5 in the storage container 106 by means of the picking arm 41 based on data from the object recognition equipment 48 and the holding mechanism 49 is subsequently activated to hold the product item 5. The picking arm 41 is then actuated to lift the product item 5 up from the storage container 106 and into the target container 6, where the holding mechanism 49 is deactivated to release the product item 5.

In the present embodiment, the vehicle 30 cannot carry the target container 6 while moving product items 5 into the target container 6, as the cantilever section 33a prevents access to the target container 6. Here, the target container 6 must lower the target container 6 into the grid 104, preferably at a location where other storage containers 106 are stacked, in order to provide that the height of the target container 6 is within reach of the picking system 40. Then, the vehicle 30 must move its cantilever section 33a away from the target container 6 to get access to the target container 6.

Second Embodiment

Figure 4B:
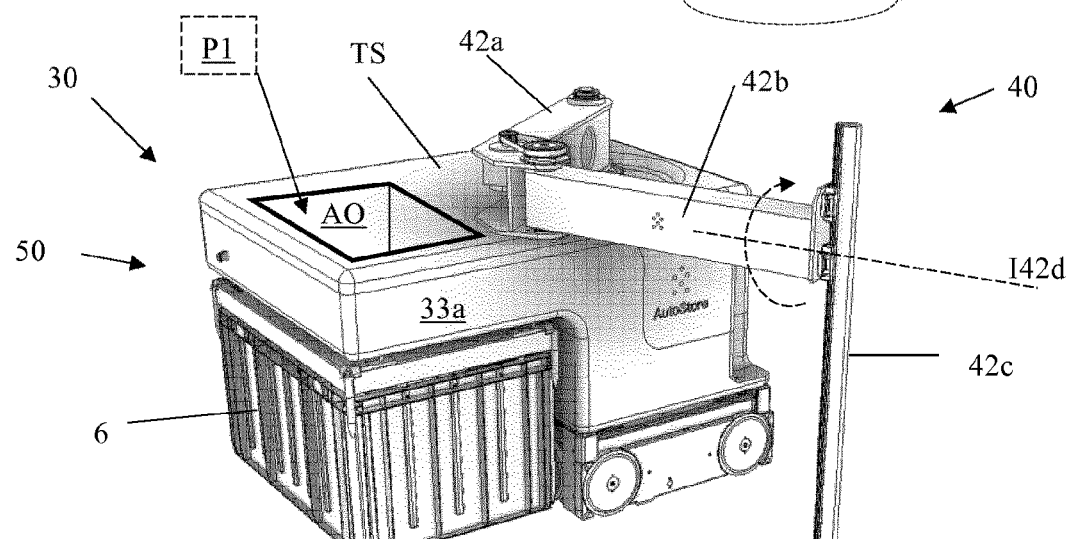
FIG. 4b illustrates a perspective view of the second embodiment of the invention.

It is now referred to FIG. 4b. The embodiment of FIG. 4b is similar to the first embodiment described in detail above, and those similarities will not be described again here.

In FIG. 4b, it is shown that the cantilever section 33a comprises an access opening AO to the target container 6 when the target container 6 is being carried by the container lifting device 50. This access opening AO is indicated in FIG. 4b as a dashed box. Hence, the container lifting device 50 is considered to be an open-top container lifting device 50.

In FIG. 4b, it is also shown that the third arm section 42c is pivotably connected to the second arm section 42b around a fourth axis I42d corresponding to the longitudinal axis of the second arm section 42b. It should be noted that axial displacement of the third arm section 42c in relation to the second arm section 42b is still possible. In this way, the picking system 40 is configured to move the product item 5 to a position above the access opening AO and hence release the product item 5 into the target container 6 through the access opening AO.

In this way, the vehicle 30 can carry the target container 6 during use of the picking system 40 and during horizontal movement of the vehicle.

Minor modifications to the container lifting device 50 may also be required. Motors and other parts of the container lifting device 50 are typically located inside the cantilever section 33a. These parts of the container lifting device 50 may be re-arranged internally towards the side of the cantilever section 33a or even moved into other parts of the vehicle body 31 to ensure that the access opening AO can be of desired size.

Third Embodiment

Figure 6A:
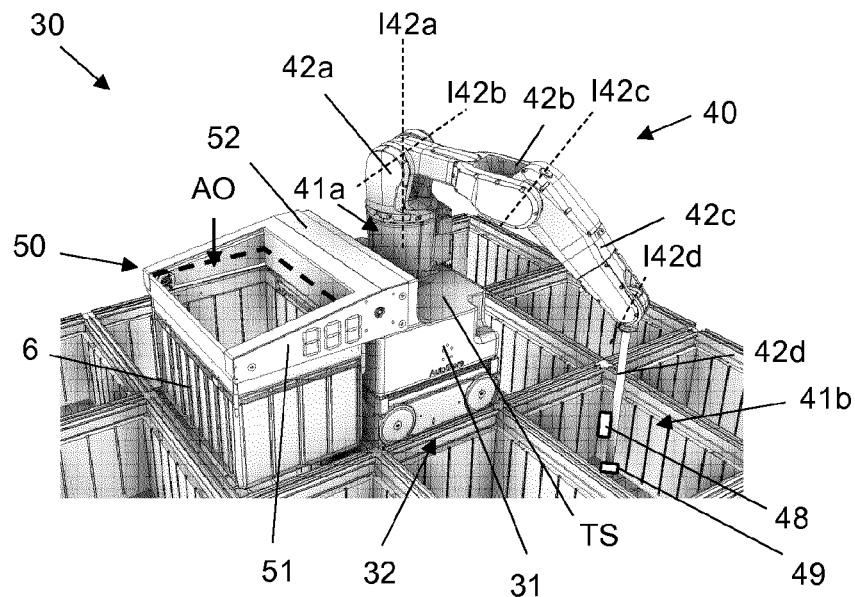
FIGS. 6a and 6b illustrates a perspective view of a third embodiment of the invention.
Figure 6B:
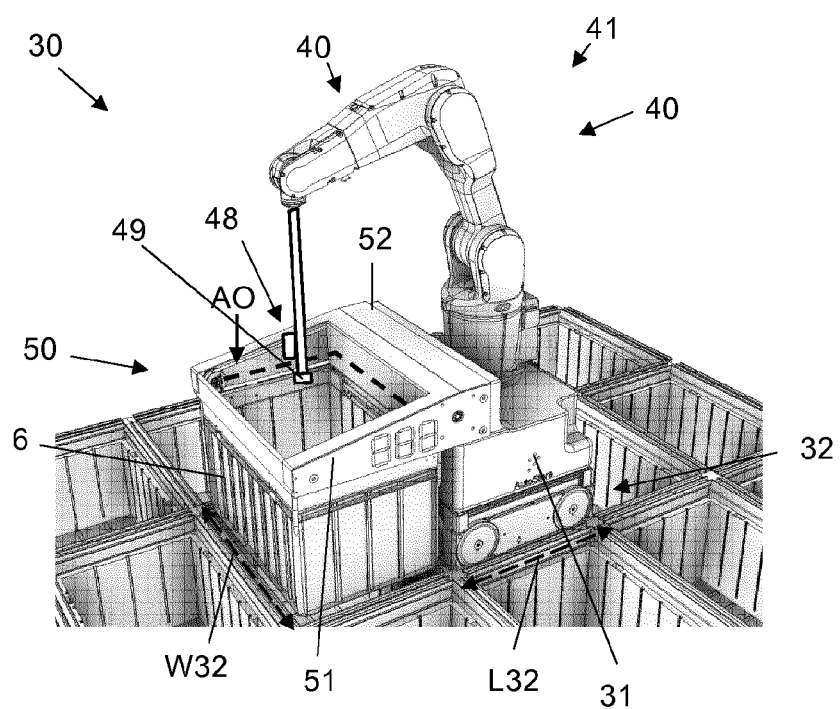

It is now referred to FIGS. 6a and 6b. Again, there are many similarities with the above embodiments, and only the differences will be described in detail below.

Also here, the container lifting device 50 is an open-top container lifting device 50.

While the above embodiments of the vehicle 30 was described to comprise a container lifting device 50 provided in a cantilever section 33a integrated in the vehicle body 31, the container lifting device 50 in FIGS. 6a and 6b comprises a frame section 51 and a housing section 52 connected to each other. The access opening OA to the target container 6 is defined through the frame section 51. The housing section 52 is connected to the top surface TS of the vehicle body 31. As shown, the frame section 51 also here forms a cantilever type of structure, where the container lifting frame 54 is suspended below the frame section 51. Motors and other parts of the container lifting device 50 are located inside the frame section 51 and/or housing section 52. This enables the cross sectional area of the access opening AO in the frame section 51 to be larger than the cross sectional area of the access opening AO in the cantilever section 33a of FIG. 4b. Preferably, the cross sectional area of the access opening AO in the frame section 51 is substantially equal to a cross sectional area of the access opening of the lifting frame 54 and/or the target container 6.

Also here, the picking system 40 is connected to the top surface TS of the vehicle body 31. Here, the picking system 40 comprises a picking arm 41 with a first end 41a pivotably connected to the top surface TS and a second end 41b connected to the holding device 49.

The picking arm 41 comprises several arm sections pivotably connected to each other. In 6a it is shown that the picking arm 41 comprises a first arm section 42a pivotably connected to the top surface TS of the vehicle body 31, a second arm section 42b pivotably connected to the first arm section 42a, a third arm section 42c pivotably connected to the second arm section 42b and a fourth arm section 42d pivotably connected to the third arm section 42c, where the holding mechanism 49 is located in the end of the fourth arm section 42d. In the present embodiment, the first arm section 42a is pivotable with respect to the vehicle body 31 around a first vertical axis I42a, the second arm section 42b is pivotable with respect to the first arm section 42a around a second horizontal axis I42b, the third arm section 42c is pivotable with respect to the second arm section 42b along a third horizontal axis I42c and the fourth arm section 42d is pivotable with respect to the third arm section 42c along a fourth horizontal axis I42d. Again, this type of picking system 40 including its control system, is commercially available, and will not be described herein in detail.

Also in this embodiment, the vehicle 30 can carry the target container 6 during use of the picking system 40 and during horizontal movement of the vehicle 30.

Fourth Embodiment

Figure 7:
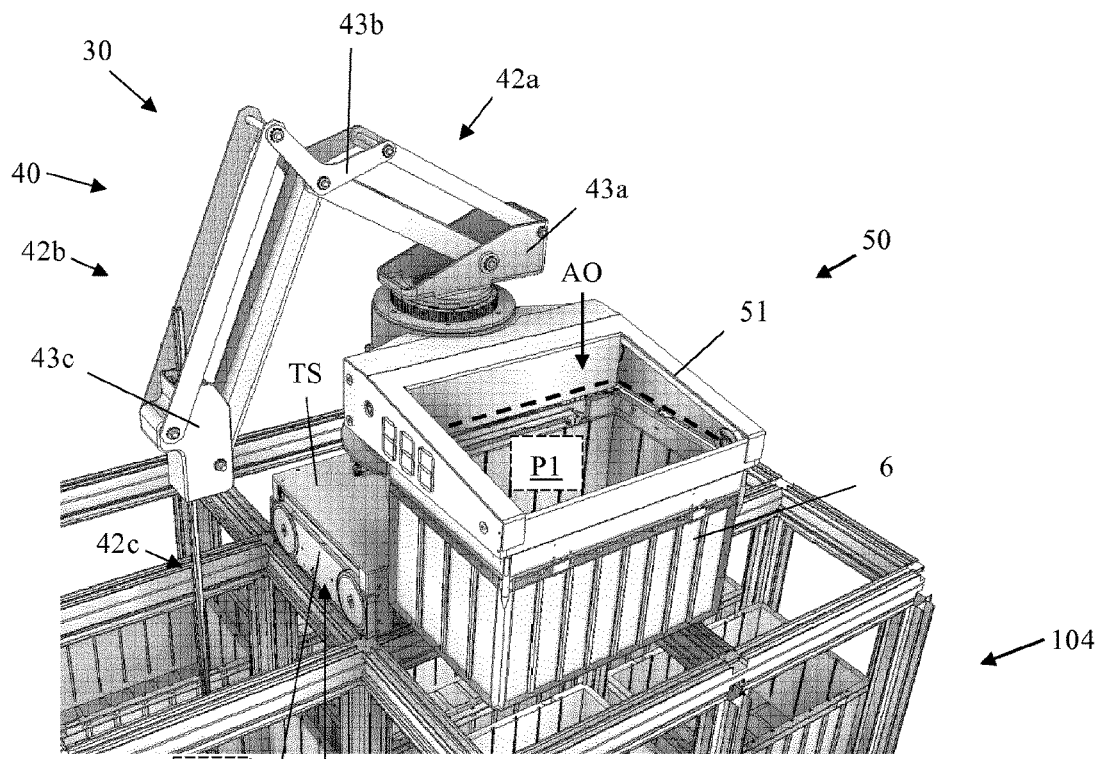
FIG. 7 illustrates a perspective view of a fourth embodiment of the invention.

It is now referred to FIG. 7. Here, the vehicle 30 has the same type of container lifting device 50 as in FIGS. 6a and 6b. Here, the picking arm 41 comprises a first arm section 42a and a second arm section 42b, each of a balanced-arm type, where each arm section comprises two parallel arm elements and where these arm elements in their respective ends are pivotably connected to first, second and third connection brackets 43a, 43b, 43c. The first connection bracket 43a is pivotably connected to the top surface TS of the vehicle 30. A third arm section 42c is axially displaceably in relation to the third connection bracket 43c, where the holding device 49 (not shown in FIG. 7) are provided in the end of the third arm section 42c. Linear actuators (not shown) may be used to move the picking arm 41.

This type of picking system 40 is considered to have a lower weight than the picking system 40 of FIGS. 6a and 6b.

Fifth Embodiment

Figure 8:
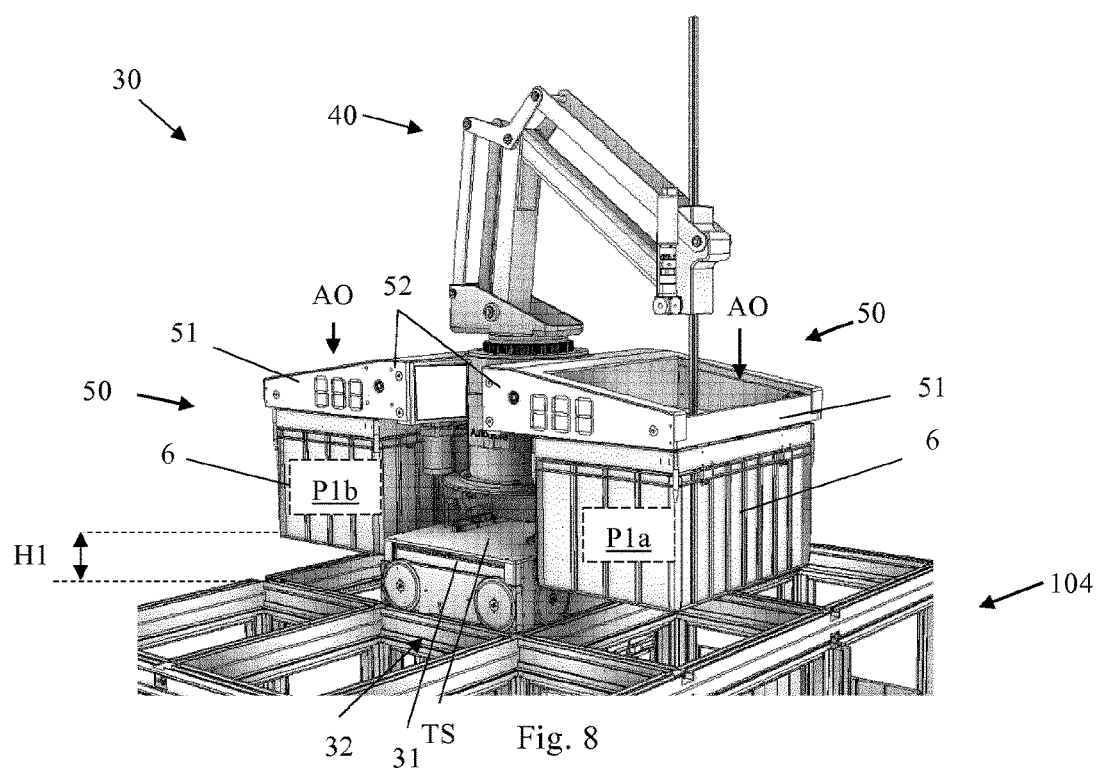
FIG. 8 illustrates a perspective view of a fifth embodiment of the invention.

It is now referred to FIG. 8. Here, the vehicle 30 comprises one picking system 40 of the same type as in FIG. 7. The vehicle 30 comprises two container lifting devices 50, each holding a target container 6.

In this embodiment, the picking system 40 may pick product items 5 to both of the target containers 6, where target container positions are indicated as P1a and P1b.

According to the embodiments described above, a picking operation may be performed by one single vehicle. When the picking operation into one target container is finished, the vehicle may leave the target container in the grid and start a new picking operation with a new target container. Other container handling vehicles will transport the target container to its final destination and may also supply the picking vehicle with new target containers when needed.

Alternative Embodiments

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

As an example, it should be noted that the vehicle 30 may be used to move product items from the container 106 carried by the container lift 50 to other containers 106 stored in the grid. It should also be noted that the vehicle 30 may be used as a container handling vehicle 200, 300, i.e. for transporting containers 106 between different locations in the grid 104, for example to and from the so-called "ports". In this last alternative, the picking system 40 is not used.

Moreover, it is possible to use a target container 6 which is different from the storage containers 106 stored in the grid 104. In such a case, the container lifting device 50 of the vehicle 30 must be adapted to such a target container 6. The target container must be delivered at ports adapted to receive such target containers.

REFERENCE NUMERALS 1 storage and retrieval system
5 product item
6 target container
20 control system
30 remotely operated vehicle
30 vehicle
30 spare parts may be used for these vehicles
31 vehicle body
31b recess
32 wheel arrangement
33a cantilever section
40 picking system
41 picking arm
41a first end
41b second end
42a first arm section
42b second arm section
42c third arm section
42d fourth arm section
43a connection brackets
43d fourth arm section
48 object recognition equipment
49 holding mechanism
50 container lifting device
51 frame section
52 housing section
54 container lifting frame
100 Framework structure
102 Upright members of framework structure
103 Horizontal members of framework structure
104 Storage grid/three-dimensional grid
105 Storage column
106 Storage container
107 Stack
108 Rail system/Container handling vehicle rail system
110 First set of parallel rails in first direction X
110a First neighboring rail of first set
110b Second neighboring rail of first set
111 Second set of parallel rails in second direction Y
111a First neighboring rail of second set
111b Second neighboring rail of second set
115 Grid opening/Container handling vehicle grid opening
119 Delivery column
120 Delivery column
122 Grid cell/Container handling vehicle grid cell
140 Delivery system
150 Delivery port
200 First container handling vehicle
201 Wheel arrangement
202,202' Container handling vehicle footprint
300 Second container handling vehicle
301 Wheel arrangement
X First direction
Y Second direction
P Horizontal plane of rail system
Wo Width of container handling vehicle grid opening
We Width of container handling vehicle grid cell
Lo Length of container handling vehicle grid opening
Lc Length of container handling vehicle grid cell
AO access opening
CI connection interface
FS rear surfaces
GP1 grid position
OA access opening
RS rear surface
SS1 first side surface
SS2 second side surface
TS top surface
VL vehicle length
VW vehicle width
H1 height
L32 length
P0 initial container position
P1 target container position
P1a target container position
P1b target container position
W32 width

The invention claimed is:

1. A remotely operated vehicle for an automated storage and retrieval system for moving a product item between a storage container stored in an automated storage and retrieval grid configured to store a plurality of stacks of storage containers, and a further container, the remotely operated vehicle comprising:
a vehicle body;
a wheel arrangement connected to the vehicle body configured to move the remotely operated vehicle along a rail system of the automated storage and retrieval system; and
a picking system for moving the product item between the storage container and the further container;
wherein the vehicle comprises a container lifting device configured to carry the further container;
wherein the picking system comprises a picking arm having a first end connected to the vehicle body and a second end;
wherein the picking system comprises a holding mechanism for releasably holding of the product item, the holding mechanism being provided in the second end of the picking arm;
wherein the container lifting device is arranged as a cantilever structure, the cantilever structure being provided as a frame section connected to a top surface of the vehicle body via a housing section; and
wherein the container lifting device comprises a container lifting frame with a connection interface for connection to and disconnection from the further container provided below the cantilever structure.

2. The remotely operated vehicle according to claim 1, where the first of the picking arm is connected to the top surface of the vehicle body.

3. The remotely operated vehicle according to claim 1, wherein the container lifting device is an open-top container lifting device.

4. The remotely operated vehicle according to claim 1, wherein the container lifting device is configured to lift the further container to a height above a top level of the grid.

5. The remotely operated vehicle according to claim 1, wherein the container lifting device is configured to lower the further container into a grid column of the grid.

6. The remotely operated vehicle according to claim 1, wherein the cantilever structure comprises an access opening to the further container being carried by the container lifting device, wherein the picking system is configured to move the product item through the access opening to and from the further container.

7. The remotely operated vehicle according to claim 1, wherein the remotely operated vehicle comprises two container lifting devices.

8. The remotely operated vehicle according to claim 1, wherein the wheel arrangement has a width equal to a width of a grid cell of the and retrieval grid and a length equal to a length of the grid cell of the automated storage and retrieval grid.

9. A method for moving a product item between a storage container stored in an automated storage and retrieval grid of an automated storage and retrieval system, wherein the grid is configured to store a plurality of stacks of storage containers, and a further container, wherein the method comprises the steps of:
- carrying the further container by means of a container lifting device of a remotely operated vehicle, the remotely operated vehicle comprising a vehicle body and a wheel arrangement connected to the vehicle body;
- moving the vehicle along a rail system of the automated storage and retrieval system to a predetermined grid position;
- controlling a picking system comprising a holding mechanism and a picking arm to hold the product item being located at an initial container position, where the picking arm has a first end connected to the vehicle body and a second end connected to the holding mechanism; and
- controlling the picking system to move the product item to a further container position and to release the product item at the further container position;
- wherein the container lifting device is arranged as a cantilever structure, the cantilever structure being provided as a frame section connected to a top surface of the vehicle body via a housing section; and
- wherein the container lifting device comprises a container lifting frame with a connection interface for connection to and disconnection from the further container provided below the cantilever structure.

10. The method according to claim 9, wherein the step of controlling the picking system to move the product item to a further container comprises moving the product item through an access opening provided above the further container.

11. An automated storage and retrieval system comprising:
- an automated storage and retrieval grid configured to store a plurality of stacks of storage containers; and
- a remotely operated vehicle comprising:
- a vehicle body;
- a wheel arrangement connected to the vehicle body configured to move the remotely operated vehicle along a rail system of the automated storage and retrieval system; and
- a picking system for moving a product item between a storage container and a further container;
- wherein the vehicle comprises a container lifting device configured to carry the further container;
- wherein the picking system comprises a picking arm having a first end connected to the vehicle body and a second end;
- wherein the picking system comprises a holding mechanism for releasably holding of the product item, the holding mechanism being provided in the second end of the picking arm;
- wherein the container lifting device is arranged as a cantilever structure, the cantilever structure being provided as a frame section connected to a top surface of the vehicle body via a housing section; and
- wherein the container lifting device comprises a container lifting frame with a connection interface for connection to and disconnection from the further container provided below the cantilever structure.

* * * * *